(12) United States Patent
Ohta

(10) Patent No.: US 6,755,601 B2
(45) Date of Patent: Jun. 29, 2004

(54) WELD NUT

(76) Inventor: Youichi Ohta, 49-8, Chigusa-cho, Hanamigawa-ku, Chiba-shi, Chiba (JP), 262-0012

( * ) Notice: Subject to any disclaimer, the term of this patent is extended or adjusted under 35 U.S.C. 154(b) by 0 days.

(21) Appl. No.: 10/098,399

(22) Filed: Mar. 18, 2002

(65) Prior Publication Data

US 2003/0175092 A1 Sep. 18, 2003

(51) Int. Cl.[7] .............................................. F16B 37/06

(52) U.S. Cl. ...................... 411/171; 411/186; 411/427; 411/930

(58) Field of Search ................................ 411/171, 185, 411/186, 187, 930, 427

(56) References Cited

U.S. PATENT DOCUMENTS

| 2,784,758 | A | * | 3/1957 | Rohe | 411/171 |
| 3,279,517 | A | | 10/1966 | Logan | |
| 3,435,871 | A | * | 4/1969 | Johnson | 411/171 |

FOREIGN PATENT DOCUMENTS

| GB | 737502 | * | 9/1955 | 411/171 |
| JP | A 6-42519 | | 2/1994 | |

* cited by examiner

Primary Examiner—Neill Wilson
(74) Attorney, Agent, or Firm—Oliff & Berridge, PLC

(57) ABSTRACT

An object of the present invention is to provide an excellent weld nut wherein the weld nut and an iron plate are closely fixed together by inserting extra metal materials upon welding into a groove around a weld projection. The present invention relates to weld nuts each having such a groove in the vicinity of such a weld projection.

9 Claims, 4 Drawing Sheets

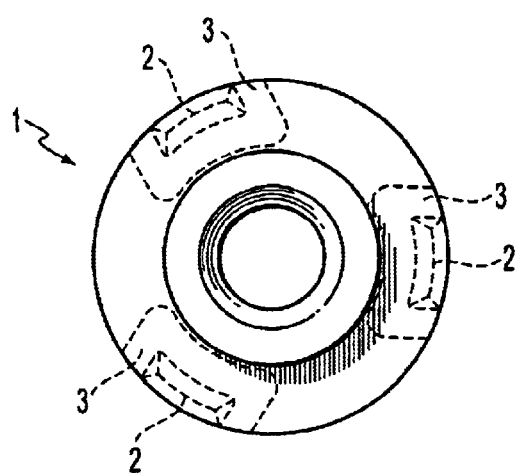
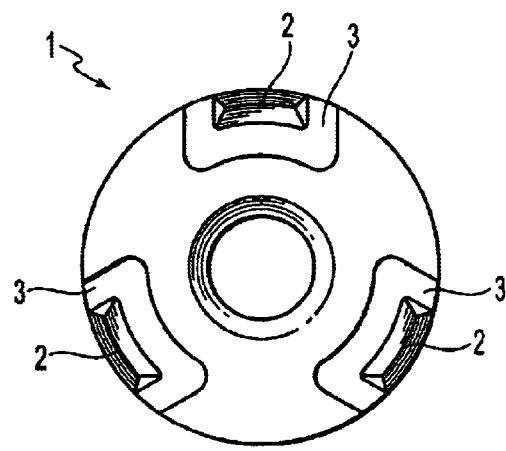
FIG. 1  FIG. 2
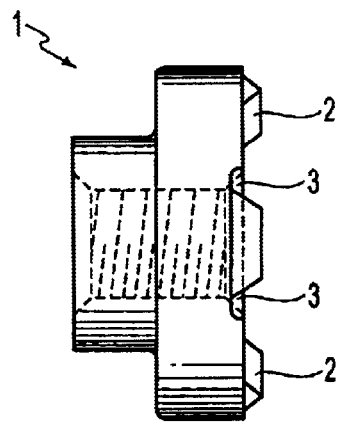
FIG. 3
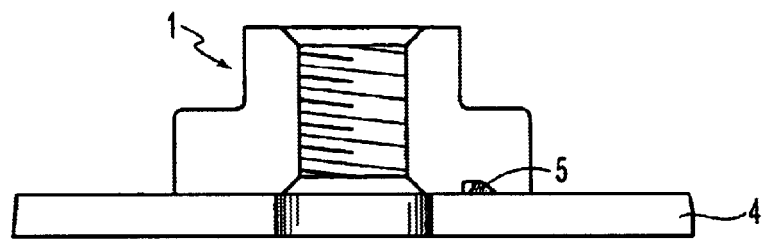
FIG. 4

WELD NUT

TECHNICAL FIELD

The present invention relates to a weld nut.

BACKGROUND OF THE INVENTION

When a weld nut was welded to an iron plate, as shown in FIGS. 6 and 7, the weld nut was fastened in a state where a gap of approximately 0.05 mm to 0.1 mm was produced between the weld nut main body and the iron plate. In particular, in a case of automobile parts and the like, when assembly was performed by coupling and bolting a part having been welded in a fashion as shown in FIGS. 6 and 7, and another part together, a problem occurred such that a water leak such as a rain water leak occurred through a gap between the weld nut and the iron plate.

In order to solve such a problem in the prior art, attempts were made to prevent a water leak by modifying the welding part to have a ring shaped weld projection as shown in FIGS. 8 and 9, or by applying, after welding, a sealing agent to a contact portion of the welded nut as shown in FIGS. 10 and 11. However, in the case of the ring-shaped weld projection, an expensive welder must be used because of welding difficulties. In addition, in the case of the sealing agent, a process for applying the sealing agent thereto is required, thereby causing problems including high costs.

SUMMARY OF THE INVENTION

The present invention is made to solve such prior art problems. The present invention successfully allows a weld nut and an iron plate to be fixed together in a closely and tightly fitting fashion such that a groove is provided in the vicinity of a weld projection, in particular, around the weld projection, whereby extra metal materials on the weld nut can enter thereinto during welding so that gaps will be eliminated.

An object of the present invention is to weld the weld nut to the iron plate in a closely and tightly fitting fashion without forming a gap between the iron plate and the nut. Another object of the present invention is to provide weld nuts allowing a welding operation to be performed between the weld nut and the iron plate in a tightly fitting fashion with low-cost methods free from using an expensive welder or performing a sealing operation.

The present invention relates to weld nuts each having at least a groove in the vicinity of a weld projection. The weld nut of the present invention is characterized in that the groove in the vicinity of the weld projection is arranged on the circumference of the weld projection. The weld nut of the present invention is characterized in that the groove is continuous. The weld nut of the present invention is characterized in that the groove is adjacent to the weld projection. The weld nut of the present invention is characterized in that the cross-sectional shape of the groove is trapezoidal. The weld nut of the present invention is characterized in that the planar shape of the weld projection is roughly rectangular. The weld nut of the present invention is characterized in that the planar shape of the weld projection is slightly arc-shaped. The weld nut of the present invention is characterized in that the cross-sectional shape of the weld projection is roughly triangular. The weld nut of the present invention is characterized in that a plurality of weld projections are provided. For the weld nut of the present invention, it is preferable that the groove provided in the vicinity of the weld projection is isolated from a void opening on the central axis side through which a screw axis, a bolt shank or the like for screwing, etc., is inserted.

Advantages

According to the present invention, the extra metal material on the weld nut is guided into the groove during welding, thereby allowing welding operations to be performed in a closely and tightly fitted manner.

BRIEF DESCRIPTION OF THE DRAWINGS

FIG. 1 is a plan view shown from the axial direction of the weld nut according to the present invention.

FIG. 2 is a plan view shown from the flange direction of the weld nut according to the present invention.

FIG. 3 is a side view of the weld nut according to the present invention.

FIG. 4 is a section illustrating a state after welding of the weld nut according to the present invention.

SYMBOLS IN THE DRAWINGS

Weld nut, 1
Weld projection, 2
Groove, 3
Iron plate, 4
Extra metal material, 5
Gap, 6
Ring-shaped weld projection, 7
Sealing material, 8
Portion, A, which is outside the center of the weld projection
Portion, B, which is inside the center of the weld projection
Groove, C
Distance, L, from the center of the weld projection to the groove
Groove width, L1

DETAILED DESCRIPTION OF THE INVENTION

As can be understood, for example, from FIGS. 1 and 2, the particularly preferable weld nuts of the present invention are those wherein a groove is provided around a weld projection. As can be understood, for example, from FIGS. 1 and 2, the particularly preferable weld nuts of the present invention are those wherein the groove is continuous. As can be understood, for example, from FIGS. 1 and 2, the particularly preferable weld nuts of the present invention are those wherein the groove is adjacent to the weld projection. As can be understood, for example, from FIGS. 1 and 2, the particularly preferable weld nuts of the present invention are those wherein this groove is isolated from a through hole on the central axis side, through which a screw, a bolt or the like is inserted for screwing, etc.

As can be understood, for example, from FIGS. 1 and 2, the particularly preferable weld nuts of the present invention are those wherein the planar shape of the weld projection is roughly rectangular. As can be understood, for example, from FIG. 12, the particularly preferable weld nuts of the present invention are those wherein the cross-sectional shape of the weld projection is symmetric when a line is vertically taken from its apex. As can be understood, for example, from FIG. 12, the particularly preferable weld nuts of the present invention are those wherein the cross-sectional shape of the weld projection is roughly triangular.

Figure 12:
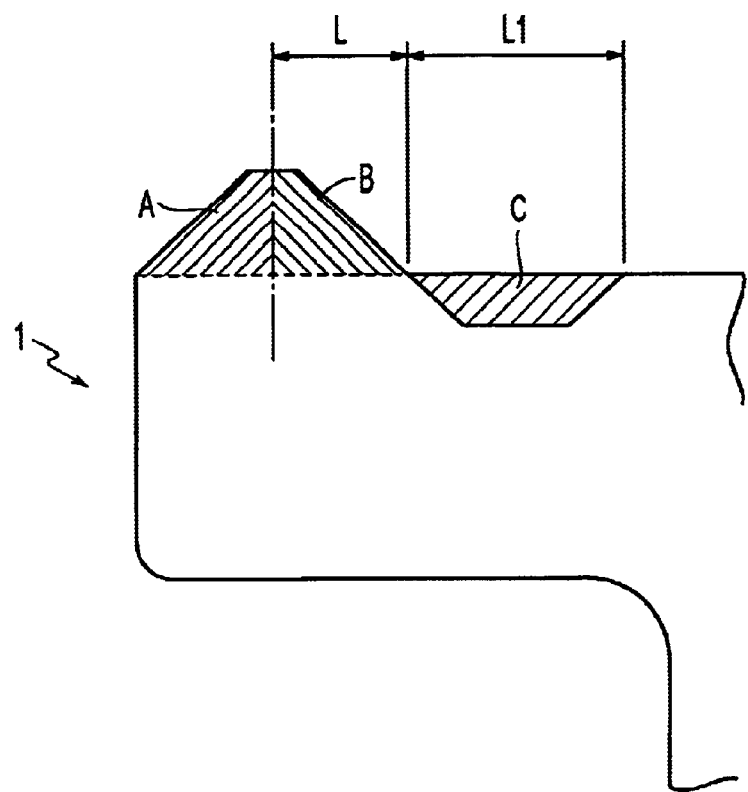
FIG. 12 is a view illustrating the relationship between the weld projection and groove of the weld nut according to the present invention.

As can be understood, for example, from FIGS. 1 and 2, the particularly preferable weld nut of the present invention is provided with a plurality of weld projections. As can be understood, for example, from FIGS. 1 and 2, the particularly preferable weld nuts of the present invention are those wherein weld projections are arranged outside the weld nut (along the outer circumference of the weld nut). The cross-sectional shape of the weld projections is not particularly limited, but, as shown in FIGS. 3 and 12, is particularly preferable to be a shape where the area of the top part is smaller than the area of the bottom part. In embodiments, it is preferable to be a rough triangle, a rough semicircle, and a trapezoid, and in particular, a rough triangle. It is particularly preferable that the top part of the weld projections is flat. By employing such a shape, the apex of the projection is easily heated at an early stage of fusion and the bottom part can be secured even if the apex portion sparks due to vibration occurring during welding.

Since weld strength after fusion increases in proportion to the projected area of the projection, the planar shape of the weld projections is preferably rectangular, elliptical, quadrangular, circular, triangular, etc. The more preferable planar shape of the weld projections is rectangular or elliptical, and most preferably rectangular.

In addition, as shown, for example, in FIGS. 1 and 2, it is particularly preferable that the projection shape is arc-shaped along the outer circumference. The number of the weld projections are not particularly limited, but it is preferable that a plurality of weld projections (including, in particular, 3 through 5 weld projections) exist.

As shown, for example, in FIGS. 1 and 2, three weld projections are preferably provided, as the weld projections are stable with respect to the weld surface so that an electric current can be stabilized during welding. It is also preferable that four weld projections are provided, as weld strength after fusion is excellent. It is satisfactory that the groove to be provided around the weld projections is any as long as it can allow extra metal materials to enter thereinto when the weld projections of the weld nut are fused.

It is satisfactory that the planar shape of the groove is adjacent to the weld projection. Specifically, as shown, for example, in FIGS. 1 and 2, the particularly preferable shape includes those which surround the weld projection. The cross-sectional shape of the groove is not particularly limited as long as it is a shape capable of allowing extra metal materials to enter thereinto, but, as shown, for example, in FIG. 12, it is particularly preferable that it is trapezoidal.

The planar shape of the nut is preferably circular or polygonal. The polygon shape includes a quadrangle, a pentagon, a hexagon, a heptagon or the like. It is preferable to be a quadrangle or a hexagon.

In addition, the cross-sectional shape of the nut is preferably, as shown in FIGS. 3 and 4, a step shape, but it may also be a flat shape.

Hereinafter, the present invention will be described in detail by referring to the drawings.

Figure 5:
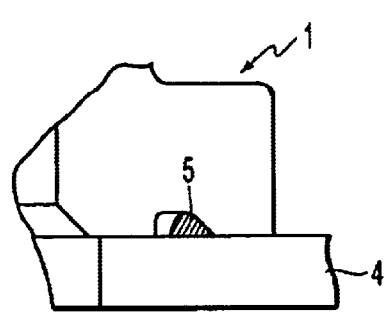
FIG. 5 is a main part enlarged view of the weld nut according to the present invention.

FIG. 1 is a plan view shown from the axial direction of the weld nut according to the present invention. FIG. 2 is a plan view shown from the flange direction of the weld nut according to the present invention. FIG. 3 is a side view of the weld nut of the present invention. FIG. 4 is a section showing a state after welding of the weld nut according to the present invention. FIG. 5 is a main part enlarged view of the weld nut according to the present invention.

Figure 6:
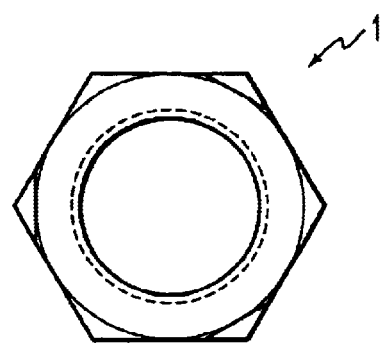
FIG. 6 is a plan view of a prior art weld nut.
Figure 7:
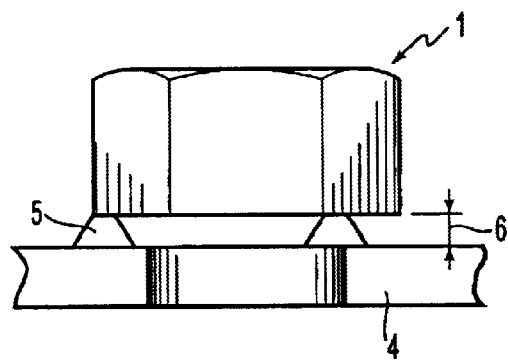
FIG. 7 is a side view illustrating a state after welding of the weld nut of FIG. 6.
Figure 8:
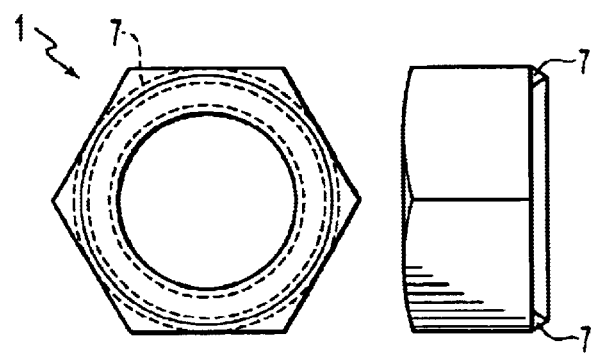
FIG. 8 is a plan view and a side view for another prior art weld nut.
Figure 9:
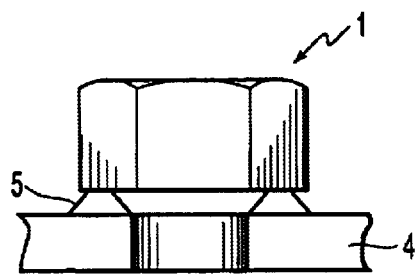
FIG. 9 is a side view illustrating a state after welding of the weld nut of FIG. 8.
Figure 10:
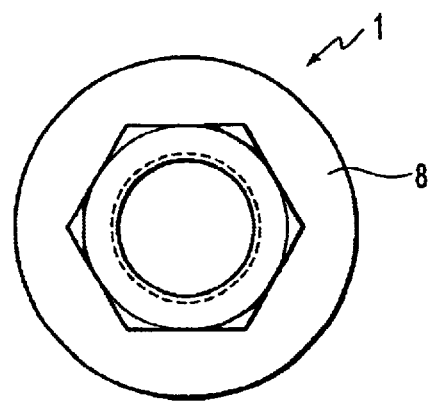
FIG. 10 is a plan view of another prior art weld nut which has been welded.
Figure 11:
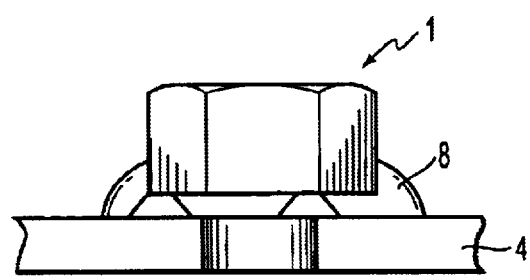
FIG. 11 is a side view illustrating a state after welding of the weld nut of FIG. 10.

In contrast, FIG. 6 is a plan view of a prior art weld nut. FIG. 7 is a side view showing a state after welding of the FIG. 6 weld nut. FIG. 8 is a plan view and a side view for another prior art weld nut. FIG. 9 is a side view showing a state after welding of the FIG. 8 weld nut. FIG. 10 is a plan view of another prior art weld nut which has been welded. FIG. 11 is a side view showing a state after welding of the FIG. 10 weld nut.

Figure 13:
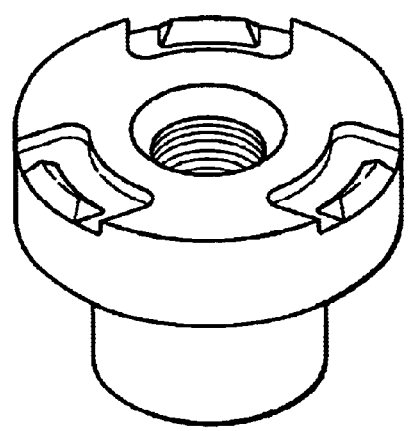
FIG. 13 is a perspective view of the weld nut of the present invention shown from the weld projection-installing side.

FIG. 12 is a view showing the relationship between the weld projection and groove of the weld nut according to the present invention. FIG. 13 is a perspective view of the weld nut of the present invention from the weld projection-installing side thereof.

Now, the welding process will be described in further detail with reference to FIGS. 1 to 4.

As shown in FIGS. 1, 2, and 3, a weld nut 1 having three weld projections 2 is arranged and welded on an iron plate 4. By performing as such, as shown in FIGS. 4 and 5, extra metal materials 5 from the weld projections 2 are received by grooves 3, so that the weld nut 1 and the iron plate 4 is closely and tightly fastened together.

FIG. 6 shows a prior art nut 1, and as shown in FIG. 7, an extra metal material 5 leads to generation of a gap 6 between the weld nut 1 and iron plate 4.

FIG. 8 show a prior art nut 1, and as shown in FIG. 9, a ring-shaped weld projection 7 leads to no production of a gap 6 between the weld nut 1 and iron plate 4.

FIG. 10 shows a prior art nut 1, and as shown in FIG. 11, a gap 6 is, due to an extra metal material 5, produced between the weld nut 1 and iron plate 4, but the gap 6 is not open, as the gap 6 is filled with a sealing material 8.

FIG. 12 illustrates the relationship between the weld projection 2 and the gap 3 on the weld nut 1, showing that the portion A of the weld projection flows, when fused, outside the weld nut 1 and the portion B of the weld projection enters, when fused, into the groove C provided on the weld nut.

ADVANTAGES OF THE PRESENT INVENTION

According to the present invention, the extra metal material upon welding enters into the groove in the vicinity of the weld projection, in particular, around the weld projection, thereby leading to no generation of gaps, so that an excellent effect is provided such that the weld nut and iron plate are closely and tightly adhered to each other. Moreover, excellent advantages. are provided such that, without using such an expensive welder as in the prior art, or without performing a sealing operation, welding operations can be performed between the weld nut and iron plate in a tightly and closely fitting fashion with low-cost methods.

What is claimed is:

1. A weld nut having a groove in the vicinity of a weld projection, wherein the cross-sectional shape of the groove is trapezoidal.

2. The weld nut according to claim 1, wherein the vicinity of the weld projection is the circumference of the weld projection.

3. The weld nut according to claim 1, wherein the groove is continuous.

4. The weld nut according to claim 1, wherein the groove is adjacent to the weld projection.

5. The weld nut according to claim 1, wherein the planar shape of the weld projection is slightly arc-shaped.

6. The weld nut according to claim 1, wherein a plurality of weld projections are provided.

7. The weld nut according to claim 1, wherein the cross-sectional shape of the weld projection is trapezoidal.

8. A weld nut having a groove in the vicinity of a weld projection, wherein the planar shape of the weld projection is roughly rectangular.

9. A weld nut having a groove in the vicinity of a weld projection, wherein the cross-sectional shape of the weld projection is roughly triangular.

* * * * *

Disclaimer

6,755,601 B2 — John A. MacBain, Carmel, IN (US). METHOD AND CONTROL SYSTEM FOR CONTROLLING PROPULSION IN A HYBRID VEHICLE. Patent dated August 10, 2004. Disclaimer filed September 9, 2015, by the assignee, Signal IP, Inc.

Hereby disclaims the complete claims 1-7, 12, 14, and 16 of said patent.

*(Official Gazette, October 27, 2015)*